(No Model.)
C. J. COOPER.
Trace Carrier.
No. 239,316.    Patented March 29, 1881.
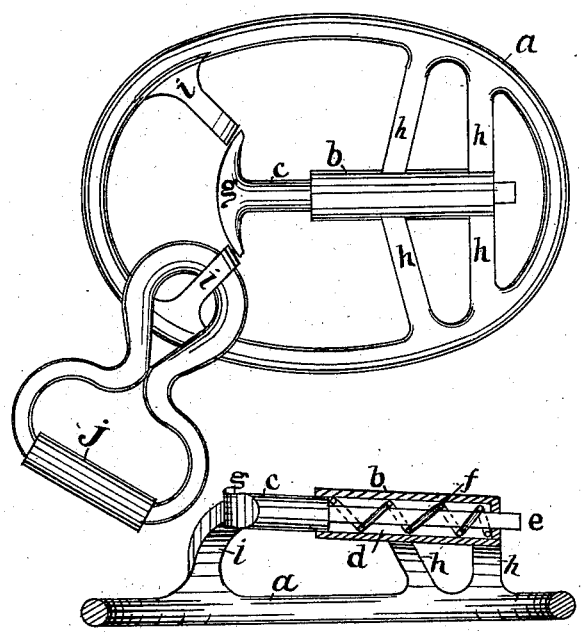
Fig 1.
Fig 2.
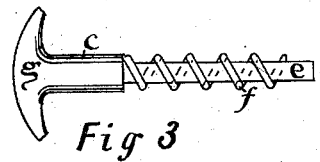
Fig 3.
Witnesses.
Wm Zimmerman
N. Cowles
Inventor.
Charles J. Cooper
By Gridley & co
Attys

UNITED STATES PATENT OFFICE.

CHARLES J. COOPER, OF CHICAGO, ILLINOIS.

TRACE-CARRIER.

SPECIFICATION forming part of Letters Patent No. 239,316, dated March 29, 1881.

Application filed August 4, 1880. (No model.)

*To all whom it may concern:*

Be it known that I, CHARLES J. COOPER, of Chicago, in the county of Cook and State of Illinois, have invented certain new and useful Improvements in Trace-Carriers for Harness; and I hereby declare the following to be a full, clear, and exact description thereof, which will enable others skilled in the art to which my invention appertains to make and use the same, reference being had to the accompanying drawings, forming a part hereof, and in which—

Figure 1 represents a plan view of my improved trace-carrier with a cockeye hung upon it. Fig. 2 represents a side elevation of the same, partly in section; and Fig. 3 represents a plan view of the bolt and coiled-wire spring which actuates it.

Various forms of trace-carriers have heretofore been made; but they are all more or less inefficient and unreliable or troublesome to use, all of which I have effectually overcome in my improved device, as hereinafter more fully described and shown.

The place to attach my trace-carrier is where the side straps supporting the breeching, crupper, and back-straps are usually united to a ring, and for which it forms a substitute at the same time.

The construction of my improved trace-carrier is as follows, namely: Upon a ring, $a$, preferably made oval, are attached four bars, $h\ h\ h\ h$, which support a chambered cylinder, $b$. Into the said cylinder $b$ is inserted an anchor-shaped bolt, $c$, which has a flat or rectangular shank, $e$, around which is placed a coiled-wire spring, $f$. The ring $a$ is also provided with two hooks, $i\ i$, upon which the cockeye $j$ is hung, as shown, and against which the spring $f$ pushes the head $g$ of the bolt $c$. The shank $e$ of the bolt $c$ is made flat, or in any other manner that will prevent its turning upon its longitudinal axis, and held in its desired position by the hole in the end wall of the chamber $d$, through which the correspondingly-formed shank $e$ passes. The shank $e$ forms a shoulder at its junction with the main part of the bolt $c$, against which one end of the spring $f$ acts, the other end thereof resting against the rear wall of the chamber $d$.

The manner of using my improved trace-carrier is as follows, namely: It is first placed or sewed into the place, as before stated, so as to form a part of the harness, and so that the head $g$ shall point toward the tail of the horse. When the cockeye $j$ is unhitched from the whiffletree its eye is pressed against the head $g$ until the spring $f$ yields sufficiently to allow it to pass in between the end of the hook $i$ and head $g$, and so that the hook $i$ shall enter the cockeye $j$, as shown, when the head $g$ will immediately spring forward against the hook $i$, and so secure the cockeye from coming out, and from which it may easily be removed, when desired, by first pressing back the head $g$.

Having thus described my invention, what I claim as new, and desire to secure by Letters Patent, is—

A trace-carrier consisting of a ring, $a$, provided with two or more braces, $h$, carrying a chamber, into which a bolt, $c$, provided with a shank, $e$, and head $g$, is inserted, and actuated by a spring, $f$, so that the head $g$ shall rest against the hook $i$ when closed, substantially as and for the purpose specified.

CHARLES J. COOPER.

Witnesses:
N. COWLES,
WM. ZIMMERMAN.